US005971120A

United States Patent [19]

Bessemer et al.

[11] Patent Number: 5,971,120

[45] Date of Patent: Oct. 26, 1999

[54] FLUID OPERATED MODULAR CLUTCH-BRAKE DEVICE

[75] Inventors: Robert H. Bessemer, Moon Township, Pa.; Robert J. Daily, Clark County, Ind.; David H. Czarnik, Arenac County, Mich.; Steve Lyons, Bedfordshire, United Kingdom; Glen A. Morris, Ford County; Larry E. Dismang, Clark County, both of Ind.

[73] Assignee: The Conair Group, Inc., Pittsburgh, Pa.

[21] Appl. No.: 08/831,231

[22] Filed: Apr. 2, 1997

[51] Int. Cl.[6] .............................. F16D 67/04; F16K 31/02

[52] U.S. Cl. ................... 192/18 A; 192/85 V; 192/88 A; 251/129.16

[58] Field of Search ................................ 192/18 A, 85 V, 192/88 A, DIG. 1; 251/129.16, 129.05

[56] References Cited

U.S. PATENT DOCUMENTS

| | | | |
|---|---|---|---|
| Re. 24,905 | 12/1960 | Giffen | 192/18 A |
| 3,279,778 | 10/1966 | Jespersen | 267/1 |
| 3,378,121 | 4/1968 | Foret | 192/18 |
| 3,407,912 | 10/1968 | Moore | 192/88 |
| 3,651,909 | 3/1972 | Zautaszwilli | 192/88 A |
| 4,096,931 | 6/1978 | Whitehurst | 192/18 A |
| 4,381,833 | 5/1983 | Foret | 192/85 V |
| 4,430,900 | 2/1984 | Valbjora | 73/701 |
| 4,463,841 | 8/1984 | Kelley | 192/18 A |
| 4,468,986 | 9/1984 | Foret | 74/822 |
| 4,559,971 | 12/1985 | Bradshaw | 251/129.01 X |
| 4,794,890 | 1/1989 | Richeson | 251/129.1 X |
| 4,896,435 | 1/1990 | Spangler, Jr. | 34/58 |
| 4,901,830 | 2/1990 | Dolby | 192/18 |
| 4,967,885 | 11/1990 | Arbjerg et al. | 192/18 A |
| 5,769,187 | 6/1998 | Sommer | 192/18 A X |

*Primary Examiner*—Rodney H. Bonck
*Attorney, Agent, or Firm*—Buchanan Ingersoll, P.C.

[57] ABSTRACT

A clutch-brake device having a housing, a shaft rotationally mounted therethrough, modular coupling units rigidly coupled to the shaft at either side of the housing, and an adapter which allows a single modular unit to be utilized interchangeably in either a clutch or a brake configuration. Each modular unit has a coupling member carrying an annular friction ring. The coupling member is rotationally connected to and spaced apart from a resilient disk defining a vacuum chamber therebetween. The resilient disk is rigidly attached to the modular unit and may be tapered towards the outer edge. The modular unit may also have several shims predisposed between the resilient disk and the coupling member which can be periodically removed to maintain the gap between the resilient disk and the annular friction ring within a preferred range. The device may have a microprocessor controlled high speed switch for controlling electromagnets which regulate engagement of the resilient disks. The microprocessor may utilize current controlled pulse width modulation and may regulate the energy applied to the electromagnets at a first energizing threshold power level and a second holding threshold power level. Additionally, the microprocessor may briefly reverse the polarity of the electromagnets to repel vacuum blocking discs associated with therewith. The microprocessor may also provide a coast time during which both the brake and the clutch are contemporaneously disengaged. The vacuum blocking discs which are typically round may have four straight edges machined slightly therein to form a square with rounded corners.

32 Claims, 7 Drawing Sheets

FIG. 4
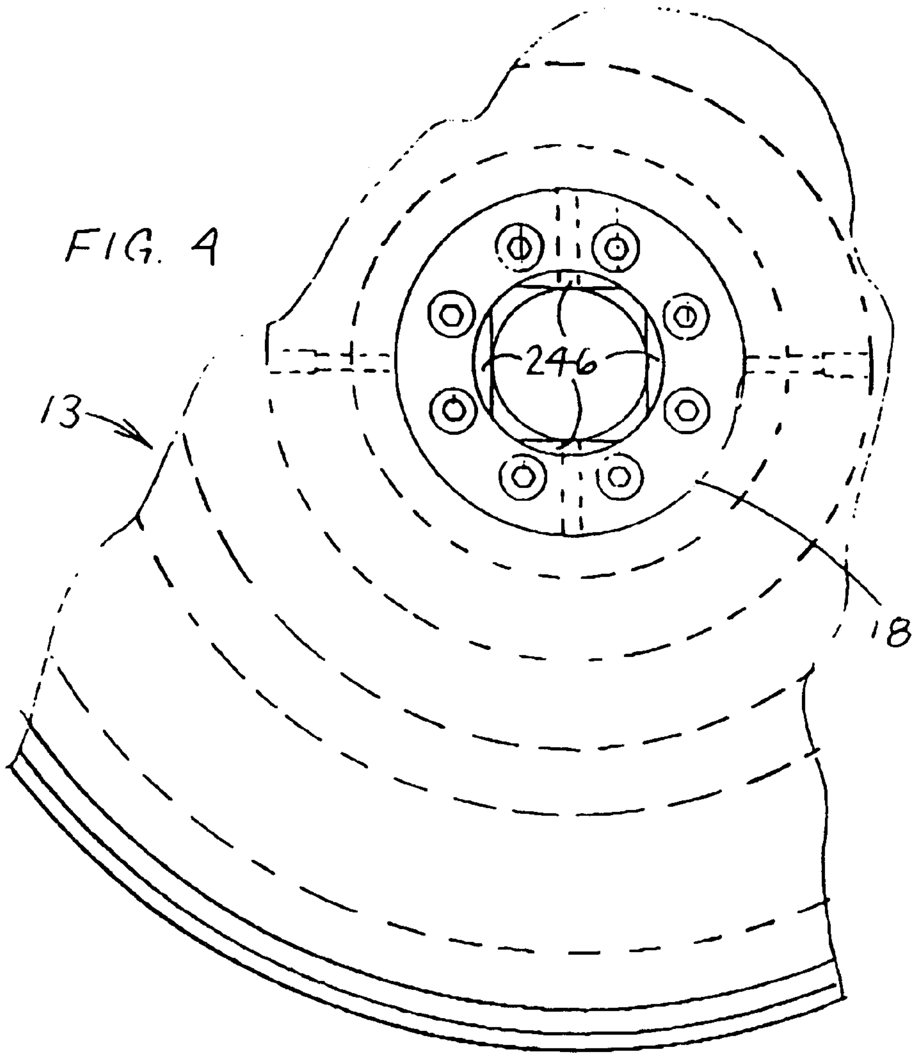
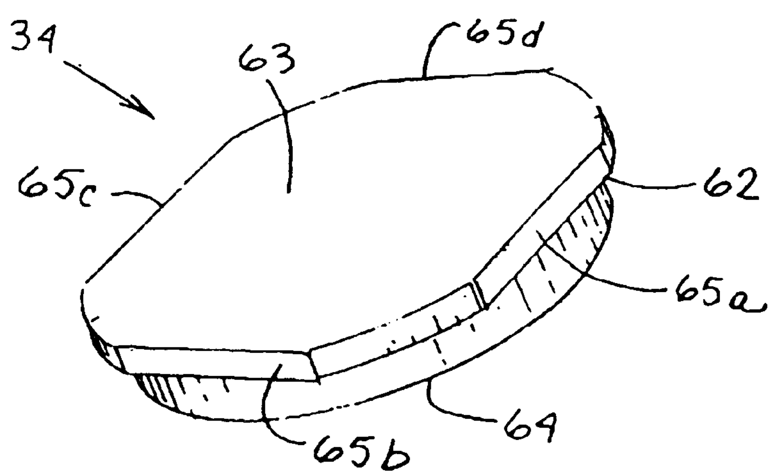
FIG. 8

FLUID OPERATED MODULAR CLUTCH-BRAKE DEVICE

BACKGROUND

1. Field of the Invention

The present invention relates to intermittent motion devices, and more particularly to fluid-operated clutch-brake devices.

2. Description of the Prior Art

Fluid operated clutch-brake devices are well known in the art. Two such devices are described in U.S. Pat. Nos. 3,378,121 and 4,381,833. However, the devices of these earlier patents make no provision for either removal, interchangeability, or field servicing of the brake and clutch units. When the annular friction ring on either the clutch side or the brake side becomes worn and in need of replacement the entire unit typically must be returned to a service center. Preloading of the rotating members is accomplished on the shaft by BELLEVILLE™ washers.

Tests performed on the devices of the earlier patents showed that after the brake, or clutch, is switched on there is an initial delay period of 3 to 3.5 milliseconds before any activity occurs. It was determined that the bulk of this time is attributable to energizing, de-energizing, and getting the vacuum blocking disc off the electromagnet to change the air flow.

Tests performed on the devices of the earlier patents also revealed that an undesirable overlap occurs. For a period of time both the clutch and brake are on at the same time. This results in putting an extra load on the motor and more wear on the friction ring. The emphasis in the past has typically been on energizing the electromagnets as quickly as possible with little thought given to rapid de-energization. Thus, engagement is predictably occurring quickly while disengagement takes somewhat longer which results in the overlap detected in the tests.

Tests performed on the devices of the earlier patents additionally showed that an air gap around the electromagnets and the associated vacuum blocking discs is necessary even when magnetic field reversal is utilized. The tests demonstrated that a sufficient air gap is necessary to allow atmospheric pressure to flow into the chamber before the plates release. Once the seal between the plates is broken atmospheric pressure can flow in through both openings.

Finally, tests performed on the devices of the earlier patents indicate that the practical effect of a transverse annular wall around the edge of the flexible disk may well be negligible. The tests indicate that it is the gap between the annular friction ring and the resilient disk which is the essential factor in performance. As the friction ring wears down and the gap between it and the resilient disk widens, the performance of the device drops off regardless of the presence of a transverse annular wall at the edge of the resilient disk. Thus, the key factor in extending the performance of a clutch-brake device appears to be maintaining the gap between the annular friction ring and the resilient disk within a preferred range.

Therefore, there is a need for an improved clutch-brake device which provides for serviceability in the field by allowing the convenient removal and interchangeability of individual clutch and brake units, as well as a means for easily adjusting the gap between the annular friction ring and the resilient disk when the annular friction ring becomes worn, and additionally which provides enhanced performance by alleviating the aforementioned problems associated with contemporary clutch-brake devices.

SUMMARY

The present invention is directed to a fluid operated clutch-brake device having self contained modular units which are interchangeable as either a brake or clutch unit and which are easily adjustable and field serviceable. The modular clutch-brake device of the present invention also can satisfy the need for faster energization of the electromagnets, rapid de-energizing and repelling of the vacuum blocking discs from the electromagnets when changing the air flow, eliminating overlap, and effecting a quicker release of the resilient disks.

An intermittent motion device having features of the present invention has a housing and a shaft passing through the housing with a modular unit removably mounted on the shaft on each side of the housing. Each modular unit has a resilient disk rotationally attached to a coupling member. The resilient disk is made from a resilient material capable of elastically deflecting under fluid pressure. The resilient disk can be tapered toward the outside edge to provide for greater deflection near the perimeter of the disk.

The coupling member carries an annular friction ring near the outward edge and is spaced apart from the resilient disk to form a vacuum chamber therebetween which is open to the atmosphere in one position of the resilient disk. The modular unit may further be provided with a lip portion extending transverse to and passing over the outer edge of the resilient disk to form a guard to protect the edge of the resilient disk and keep debris and foreign particles from entering into the vacuum chamber. An adapter plate is provided on the brake side of the device for fixing the coupling member to the housing in a brake application.

A pressure plate rigidly attaches the resilient disk to the modular unit. The internal bearings carried in the modular unit are easily preloaded by a wave spring between the retaining ring and the bearings. Thus each modular unit is individually preloaded which eliminates the need to preload the modular units on the shaft using the greatly more difficult to install BELLEVILLE™ washers as used in the devices of the earlier patents.

The individual modular units may be easily disassembled to adjust and maintain the gap between the resilient disk and the annular friction ring. The gap is maintained by removing one of several thin disk-shaped shims which are predisposed in the modular unit between the resilient disk and the coupling member. As the annular friction ring wears down a shim can be removed to keep the gap in the desired range. Moreover, even after several adjustments when the annular friction ring becomes too worn to adjust further, only the particular modular unit need be returned for replacement with another modular unit. Either modular unit may be easily, and individually, dismounted from the base and field serviced or shipped to a service center if necessary for repair or replacement.

A means for changing the fluid pressure in the chamber is provided comprised of a high-speed switch controlled by a microprocessor and utilizing current controlled pulse width modulation. Preferably a 48 volt DC source is provided to operate the magnetic valves. Preferably, a microprocessor controlled high speed switch regulates the voltage to the actuators. The microprocessor may utilizing pulse width current modulation to govern energy applied to the electromagnets at different times. The microprocessor may provide for a first threshold power level to rapidly energize the electromagnet and draw the vacuum blocking disc against the vacuum. Once the blocking disc is on the electromagnet the microprocessor preferably reduces the power to a second threshold level sufficient to hold the blocking disc on the electromagnet. The first threshold level can be 100 percent and the second threshold level can be 50 percent.

Vacuum blocking discs are provided to control the air flow into and out of the vacuum chamber via passageways provided in the housing. To provide the a sufficient air gap for permitting atmospheric pressure flow into the chamber the vacuum blocking discs may have four straight sides ground into the edges thereof, forming a square with rounded corners. Furthermore, the microprocessor can briefly reverse the polarity of the electromagnets to actually repel the vacuum disc when changing the air flow. This can speed the release of the resilient disk and also help to more rapidly de-energize the electromagnet. During the brief reversal of polarity the microprocessor additionally can delay activating the opposing electromagnet. This provides a "coast" period during which both the brake and the clutch are contemporaneously disengaged which can prevent overlap. Additionally, the microprocessor can be programmed to learn the characteristics of the particular electromagnets and automatically tune itself to suit either vacuum or pneumatic devices.

DRAWINGS

These and other features, aspects, and advantages of the present invention will become better understood with regard to the following description, appended claims, and accompanying drawings wherein:

FIG. 4 is a front view of the modular unit shown in FIG. 3;

FIG. 8 illustrates an embodiment of a vacuum blocking disc; and

DESCRIPTION

Figure 1:
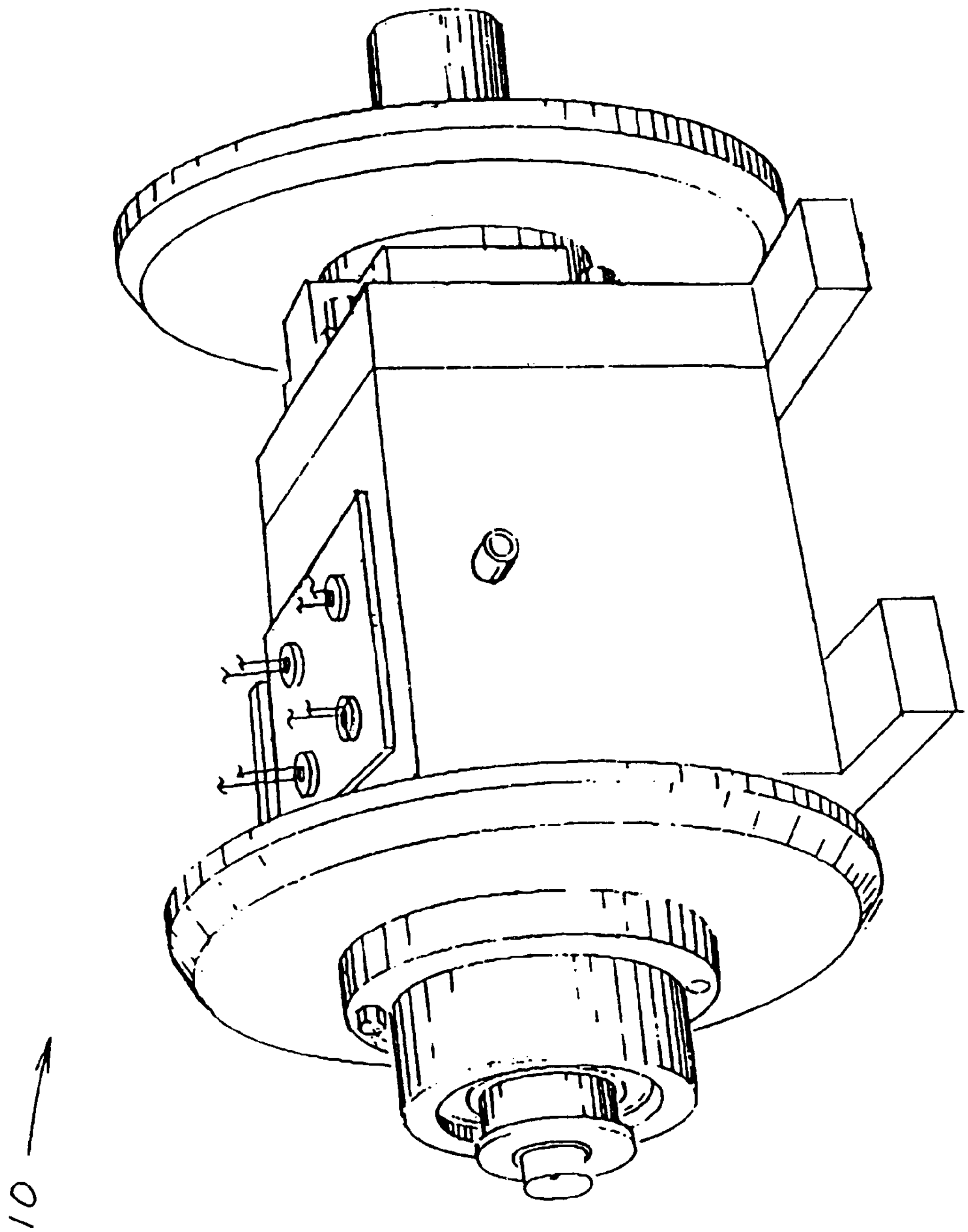
FIG. 1 is a perspective view of a preferred embodiment of this invention.
Figure 2:
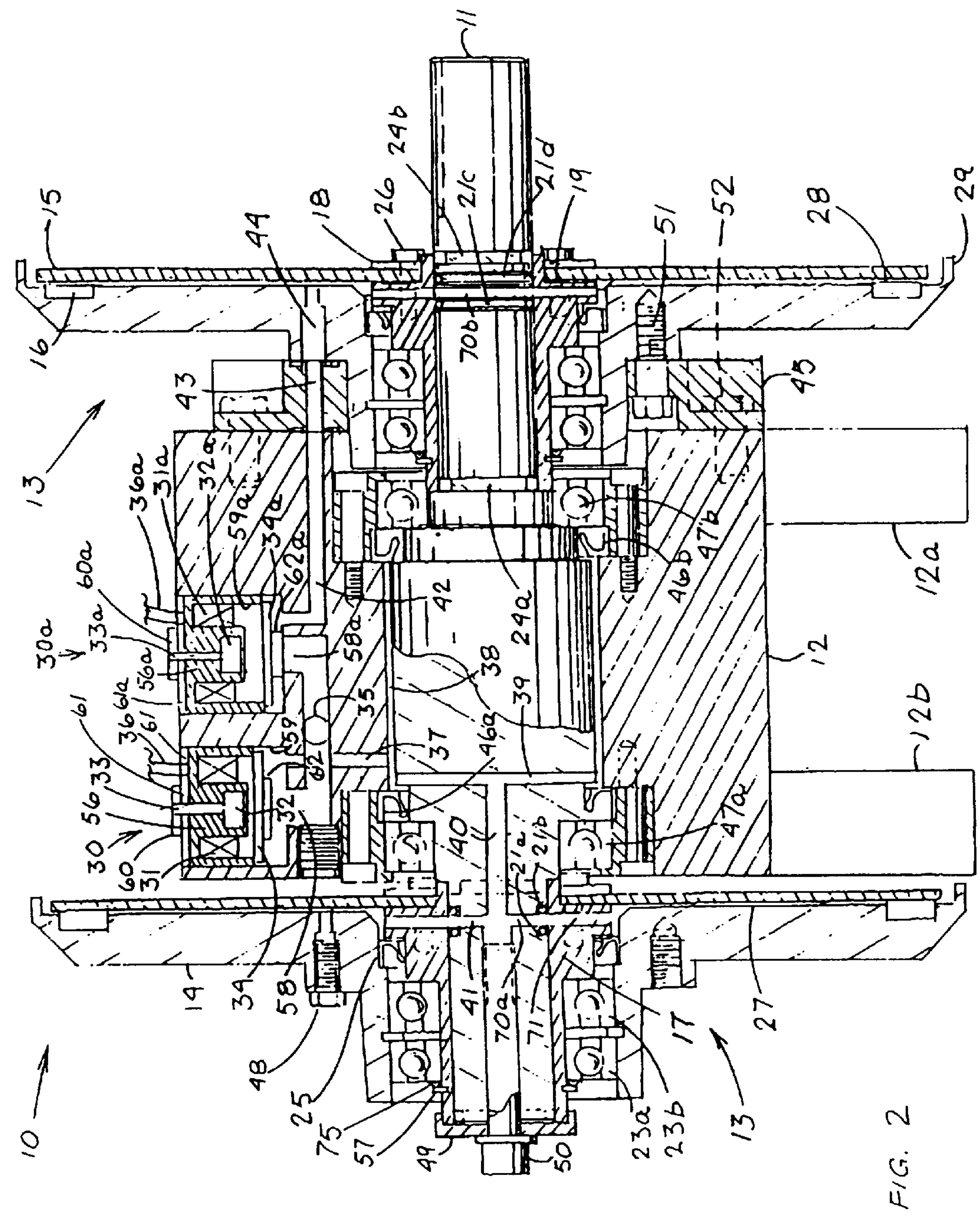
FIG. 2 is a cross-sectional view through the center thereof.

With reference now to the drawings, a clutch-brake having features of a presently preferred embodiment of the invention is illustrated in FIGS. 1 and 2. An electro-vacuum clutch-brake 10 has a central shaft 11 with its associated coupling assembly, a fixed housing 12, a modular unit 13, a brake adapter plate 45, and a four identical actuator assemblies 30, 30*a*, 30*b*, and 30*c*. The housing 12 is preferably of a generally rectangular cross section with legs 12*a*, 12*b* for mounting the clutch brake on a fixed base. A port 35 for a vacuum generator is provided passing inwardly of the housing 12 and is associated with the actuator assemblies 30–30*c* via passageways 58, 58*a*.

Now referring to the cross sectional view of the device shown in FIG. 2, only two of the actuator assemblies and associated vacuum passageways are illustrated to simplify the drawing and for more conveniently describing the device. The other two actuator assemblies with their associated vacuum passageways are located directly behind and are identical to those shown. A preferably centrally-located, freely-rotatable shaft 11 is mounted to the housing 12 on bearings 47*a*, 47*b* which are fixed to the housing 12 and permit free rotation of the shaft 11 independently of the housing 12. Identical modular units 13 are mounted on both sides of the housing 12 and may be configured to function either as a clutch or, using an adapter plate 45, a brake. On the brake side of the housing 12, shown as the right side in FIGS. 1 and 2, adapter plate 45 is provided to rigidly attach the modular unit 13 to the housing 12.

Figure 3:
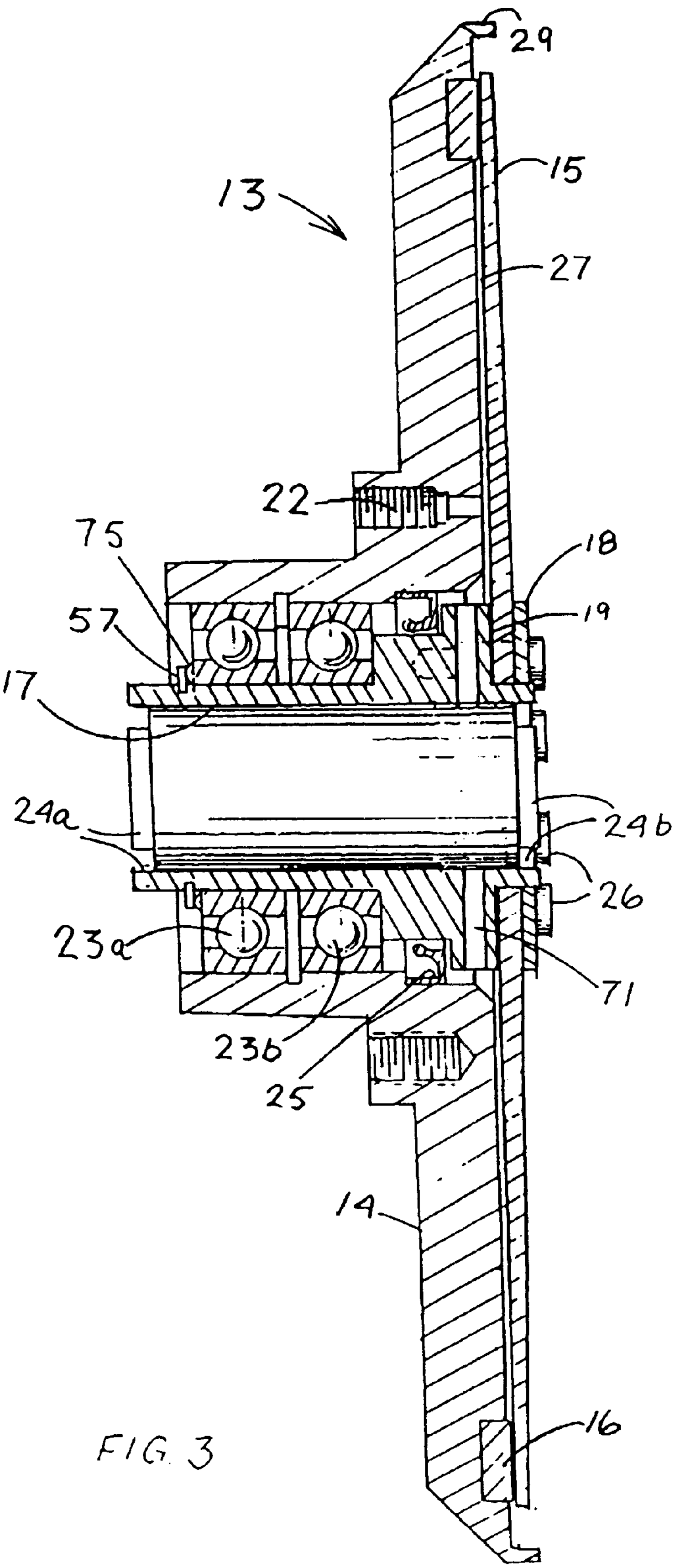
FIG. 3 is a side view of an embodiment of a modular unit.
Figure 5:
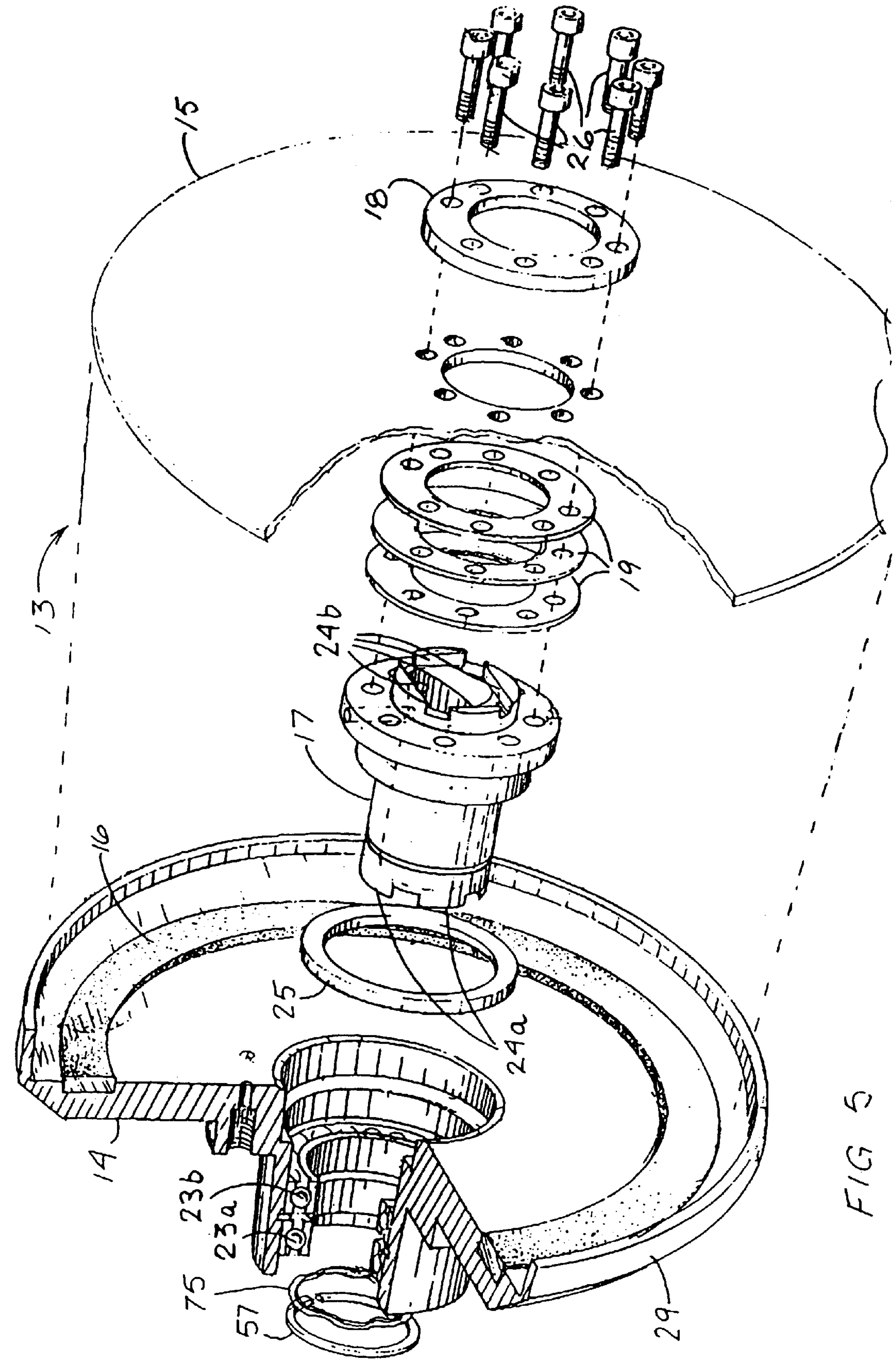
FIG. 5 is an exploded perspective view of the modular unit shown in FIG. 3.

As shown in FIGS. 3–5, each modular unit 13 is completely self-contained. As shown most clearly in the exploded view in FIG. 5, each modular unit 13 has a sleeve member 17, a coupling member 14 carrying an annular friction ring 16 on the interior surface, and a resilient disk 15. The coupling member 14 is rotationally attached to the sleeve 17 on bearings 23*a*, 23*b* and spaced apart from the resilient disk 16 which is rigidly coupled to the sleeve member 17. The space between the coupling member 14 (and the annular friction ring 16) and the resilient disk 15 defines the vacuum chamber 27 which is open to the atmosphere in the disengaged position of the resilient disk 15. The coupling member 14 is retained on the sleeve member 17 by a retaining ring 57. A rotary seal 25 is provided between the sleeve member 17 and the coupling member 14 at the vacuum chamber 27 side of the modular unit 13. The resilient disk 15 is attached to the sleeve member 17 by a pressure plate 18 and bolts 26. A number of shims 19 are predisposed between the resilient disk 15 and the sleeve member 17 which define the gap 28 between the resilient disk 15 and the annular friction ring 16. The gap 28 is preferably preset, and maintained, between about 0.001 and 0.003 inch.

Figure 6:
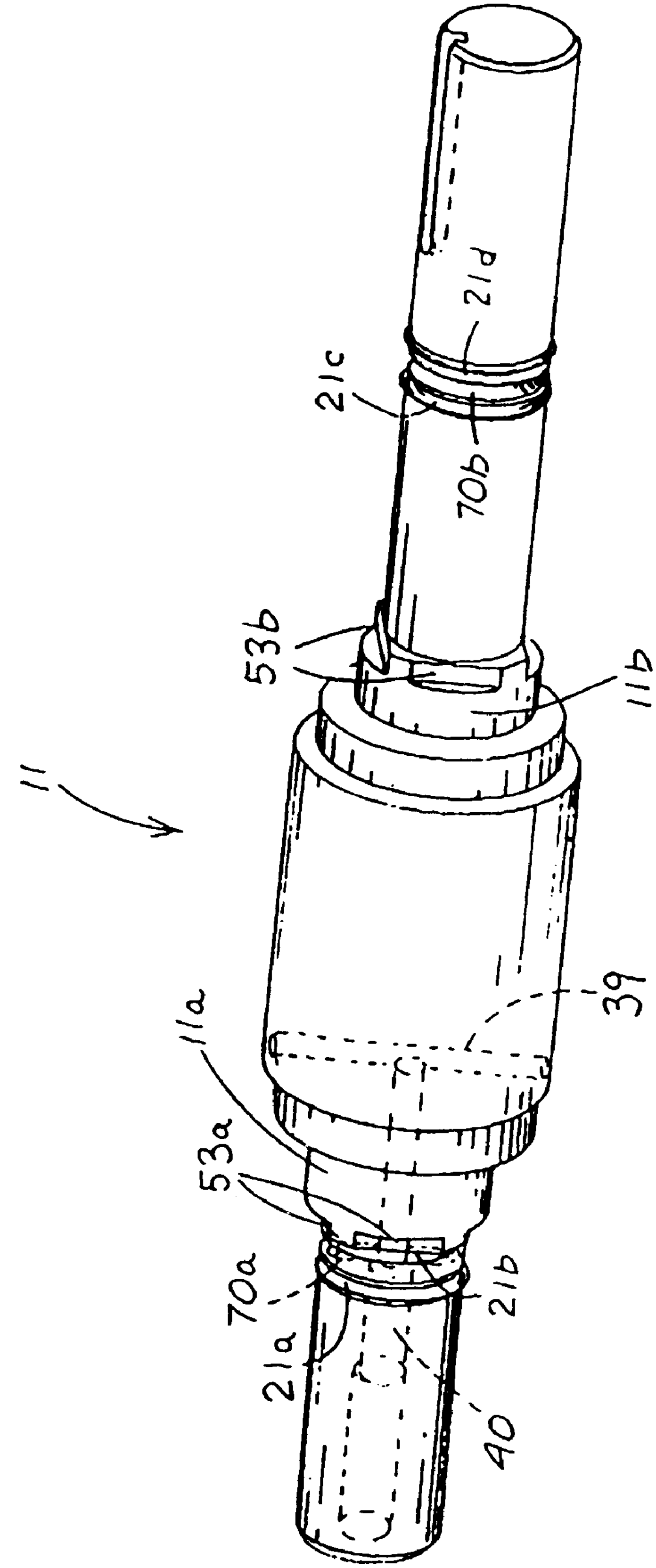
FIG. 6 is a perspective view of the shaft.

As shown in FIG. 6, each end of the shaft 11 has a stepped up diameter portion 11*a*, 11*b* which each have flats 53*a*, 53*b* machined therein. The sleeve member 17 has protruding flats 24*a*, 24*b* on either end, as shown in FIGS. 4 and 5, which mate with flats 53*a*, 53*b*, depending on which side of the device the modular unit 13 is installed. These mating flats rigidly couple the sleeve member 17 to the shaft 11.

Figure 7:
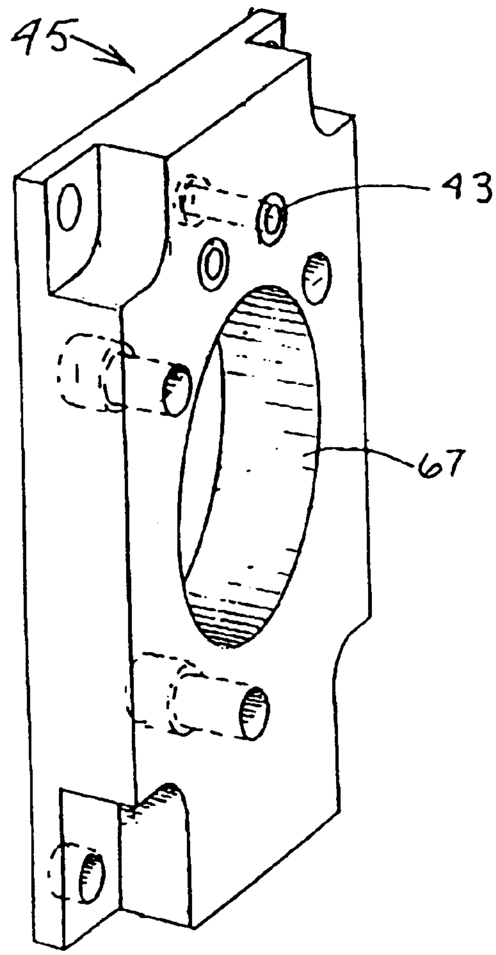
FIG. 7 is a perspective view of an adapter plate for use with a modular unit in a brake application.

Referring back to FIG. 2, the brake adapter plate 45 attaches to the housing 12 with bolts 52 and also to the coupling member 14 with bolts 51. The adapter plate 45, shown most clearly in FIG. 7, has passageway 43 drilled therethrough to provide access to the passageway 44 drilled through the coupling member 14 which provides access into the vacuum chamber 27. Seals 21*a*, 21*b*, 21*c*, and 21*d* prevent leakage along the shaft 11 from annular grooves 70*a* and 70*b* in the shaft 11 which communicate with vacuum passageway 71 in the sleeve member 17 to access the vacuum chamber 27. In the clutch configuration, shown at the left side of the device 10, the passageway 44 in the coupling member 14 is closed off by plug 48 to seal the vacuum chamber 27.

Access to the vacuum chamber 27 is provided via annular groove 70*a* in the shaft 11 and passageway 41, drilled transversely through the left end of the shaft 11, and which in turn communicates with passageway 40 drilled axially through the center of the shaft 11. Seals 21*a*, 21*b* are provided on either side of annular groove 70*a* to prevent leakage along the shaft 11. A bolt 50 both seals off passageway 40 from the outside and additionally locks retaining cap 49 onto the shaft 11 thereby retaining the modular unit 13. Passageway 40 communicates with passageway 39, also drilled transversely through a mid portion of the shaft 11. From there, passageway 39 communicates with airspace 38 between the shaft 11 and the housing 12 which in turn communicates with passageway 37. The airspace 38 is otherwise sealed off by rotary seals 46*a*, 46*b* between the housing 12 and the shaft 11. When a vacuum is applied through vacuum generator port 35 and the vacuum blocking disc 34 is in the open position, as illustrated, the resilient disk 15 on the left side of the device 10 will flex into the vacuum chamber 27 and engage the annular friction ring 16. This will couple the shaft 11 with the coupling member 14. When the resilient disk 15 is not engaged, the coupling member 14 rotates freely on sleeve member 17 on bearings 23*a*, 23*b*. The coupling member 14 thus can act as a drive member for the device 10, as for example, when linked with a drive motor by means of a conventional pulley belt. The resilient disk 15 fixed to the right, i.e. brake, side of the shaft 11 may be actuated to flex and engage the annular friction ring 16 on the brake side in the same manner previously described.

The annular friction ring 16, is preferably composed of a hard resilient rubber and cork mixture, or other known brake and clutch friction material, and provides a damping effect to the resilient disk 15 upon engagement with the annular friction ring 16. The coupling member 14 may additionally be provided with lip 18 around the outside edge thereof which extends over the outer edge of the resilient disk 15 and can act as a guard 18 to help keep debris out of the vacuum chamber 27 and also help prevent damage to the edge of the resilient disk 15.

Only the brake actuator assembly 30*a* will be fully described in order to simplify the description since all of the actuator assemblies are identical. The actuator assembly 30*a* is snugly received in airtight relationship in a suitable circular bore 59*a* provided in the top of the housing 12. The actuator assemblies 30, 30*a* act as valves to switch the resilient disk 15 upon suitable electrical actuation as will later be described.

The brake valve 30*a* has a circular casing 56*a* carrying a conventional electromagnet core 31*a* surrounding a central preferably axially extending gas inlet port 32*a*. The circular casing 56*a* and core 32*a* are retained in the bore 59*a* by bolt 60*a* and plate 61*a*. The bolt 60*a* has an air inlet hole 33*a* axially aligned with gas inlet port 32*a*. A valve chamber 58*a* is formed by the bore 59*a* of the housing 12 in conjunction with the lower end of the valve. Within the chamber 58*a* is positioned a generally cylindrical vacuum blocking disc 34*a* having a diameter less than the diameter of bore 59*a* to provide for direct communication between the gas inlet port 32*a* and the vacuum passageway 42 when vacuum blocking disc 34*a* is in the position shown in FIG. 2. Preferably the vacuum blocking disc 34*a* is not in any way connected with the housing or other portions of the valve so that it is truly floating and is formed of a magnetic material such as iron or steel. As illustrated in FIG. 8, vacuum blocking disc 34 has a first planar portion 63 facing the gas inlet port 32 and a second planar 64 portion facing the vacuum port 58 which extends to the outside of the housing through vacuum generator port 35 for connection to a suitable vacuum supply source such as a vacuum pump. The vacuum blocking disc 34 has an annular notch 62 machined into the second planar portion 64 to permit air at atmospheric pressure to flow around the edge of the disc and into the vacuum chamber 27 at the same time that the disc is closing off the vacuum port 58 in order to disengage the resilient disk 15 from the annular friction ring 16. Additionally, the vacuum blocking disc 34 preferably can have four straight edges, 65*a*–65*d*, ground into the sides of the upper planar portion 63 to form a square with rounded corners. Preferably only about 0.050 inch is ground from each side so as not to lose the magnetic field. The other vacuum blocking discs are identical to the one shown in FIG. 8.

Figure 9:
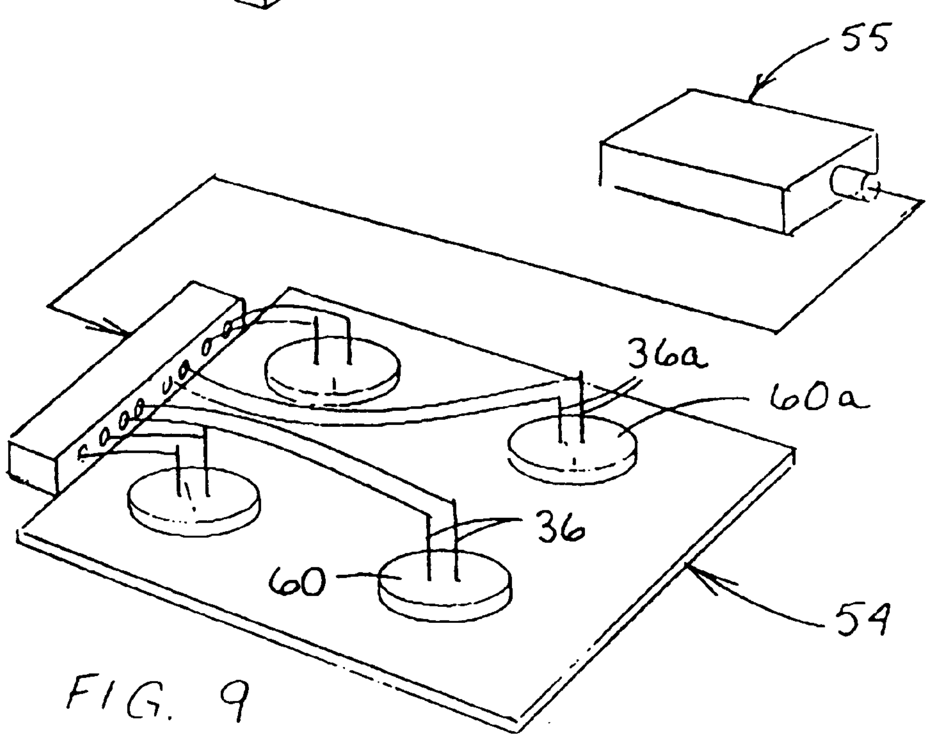
FIG. 9 illustrates a high-speed switch and microprocessor control unit.

In FIG. 9, electric leads 36, 36*a*, for example, are provided for each valve and are connected preferably to a microprocessor controlled high-speed switch 54 for actuating the electromagnets 31, 31*a*. The microprocessor 55 preferably can operate the actuators 30, 30*a* at two threshold levels, the first being about 100% to rapidly energize the actuators 30, 30*a* and quickly attract the blocking disc 34*a*. The second level is about 50% since not as much energy is required to hold the blocking disc 34*a* up as is required to initially draw the blocking disc 34*a* up off the vacuum port 58*a*. Preferably, a 48 volt DC power source is supplied to 12 volt coils and the microprocessor 55 utilizes pulse width current modulation to maintain the threshold power levels.

The operation of a preferred embodiment of the device 10 is shown in FIG. 2 with the clutch side engaged. The modular unit 13 in the clutch configuration can be connected to a drive belt or chain and with an electric motor giving constant rotation of the unit. Each of the vacuum ports 58, 58*a* are connected through port 35 with a vacuum source such as a vacuum pump providing a constant vacuum, holding vacuum blocking disc 42 in the up position with the clutch disk 15 actuated and a vacuum in chamber 27.

To stop the shaft 11, microprocessor 55 activates high-speed switch 54 to briefly reverse the polarity of electromagnet 31, preferably about 2 milliseconds, which repels vacuum blocking disc 34 off the electromagnet 31 and closes off the vacuum port 58 which permits atmospheric pressure to flow into the chamber 27 thereby disengaging the resilient disk 15 from the annular friction ring 16. The brief application of reverse polarity can also speed up the release of the vacuum blocking disc 34 which in turn more quickly releases the resilient disk 15. During this approximately 2 millisecond delay, the microprocessor 55 can also delay activating the opposite actuator 30*a* to provide a brief "coast" time, during which the resilient disk 15 on both the brake and clutch sides of the device 10 is contemporaneously disengaged to help avoid overlap. Eliminating overlap can extend the life of the annular friction rings 16, resilient disks 15, and the drive means.

At the end of the coast period the microprocessor 55 can preferably activate high-speed switch 54 to energize electromagnet 31*a* at a first threshold level, which can be about 100%, pulling the disc 34*a* against electromagnet 31*a* to block the gas inlet port 32*a*. This action interconnects the vacuum generator, through vacuum port 35 and passageways 42, 43, and 44 with the vacuum chamber 27 which draws air from the vacuum chamber 27 at a faster rate than the air can enter through the gap 28 between the resilient disk 15 and the annular friction ring 16. Thus the resilient disk 15 is resiliently flexed from its plane by the vacuum and pulled into coupling engagement with the annular friction ring 16. This brings the shaft 11 to an immediate stop even though the coupling member 14 on the clutch side of the device 10 can continue rotating. After the blocking disc 34*a* is on the electromagnet 31*a*, the microprocessor preferably can reduce the energy provided to the electromagnet 31*a* to a lower threshold level, which can be about 50%. The lower threshold power level can be set at the minimum level required to hold the vacuum blocking disc 34*a* against the electromagnet 31*a*. Additional energy applied at this point is mostly converted to heat which can shorten the life of the electromagnets.

While a specific embodiment has been described in detail, it will be appreciated by those skilled in the art that various modifications and alternatives to those details could be developed in light of the overall teachings of the disclosure. Accordingly, the particular embodiment disclosed herein is intended to be illustrative only and not limiting to the scope of the invention which should be awarded the full breadth of the following claims and any and all embodiments thereof.

What is claimed is:

1. An intermittent motion device for acting with rotational movement of a shaft having a housing with a clutch side and a brake side and a shaft passing through said housing and a pair of modular units rigidly coupled to said shaft on each of said clutch and brake sides, each said modular unit comprising:

a. a sleeve member rigidly coupled to said shaft;

b. a resilient disk capable of elastically deflecting under a force created by fluid pressure, said resilient disk rigidly attached to said sleeve member;

c. a coupling member rotationally attached to said sleeve member, said coupling member carrying an annular friction ring, said coupling member with annular friction ring being spaced apart from said resilient disk, thereby defining a vacuum chamber open to the atmosphere at a disengaged position of said resilient disk;

d. a brake adapter plate rigidly attachable to said brake side of said housing, said coupling member rigidly attachable to said brake adapter plate, said brake adapter plate fixing said coupling member to said housing when said modular unit is utilized as a brake; and e. means for changing the fluid pressure in said vacuum chamber to cause said resilient disk to flex resulting in engagement of said resilient disk with said annular friction ring to couple said shaft with said coupling member.

2. The device of claim 1 wherein said means for changing the fluid pressure comprises:

a. at least one actuator assembly associated with said vacuum chamber;

b. at least one vacuum blocking disc associated with said at least one actuator assembly, said vacuum blocking disc sized and positioned to one of permit and prevent fluid at atmospheric pressure from flowing into said vacuum chamber, said vacuum blocking disc formed of a magnetic material;

c. at least one electromagnet associated with said at least one vacuum blocking disc; and d. at least one switch associated with said at least one electromagnet, said at least one switch activating said at least one electromagnet at one point in time to attract said at least one vacuum blocking disc to change the fluid pressure.

3. The device of claim 1 wherein said at least one vacuum blocking disc is a round disc having four straight edges ground into it to form a square with rounded corners.

4. The device of claim 3 wherein a maximum of 0.050 inch is ground from said at least one vacuum blocking disc.

5. The device of claim 1 wherein said resilient disk is tapered towards an outer edge.

6. The device of claim 1 wherein said coupling member further has a lip transverse to said shaft, said transverse lip extending over an outer edge of said resilient disk and providing a guard to prohibit debris and foreign objects from entering into said chamber through said gap between said resilient disk and said annular friction ring.

7. An intermittent motion device for acting with rotational movement of a shaft having a housing with a clutch side and a brake side and a shaft passing through said housing and a pair of modular units rigidly coupled to said shaft on each of said clutch and brake sides, each said modular unit comprising:

a. a sleeve member rigidly coupled to said shaft;

b. a resilient disk capable of elastically deflecting under a force created by fluid pressure, said resilient disk rigidly attached to said sleeve member;

c. a coupling member rotationally attached to said sleeve member, said coupling member carrying an annular friction ring, said coupling member with annular friction ring being spaced apart from said resilient disk, thereby defining a vacuum chamber open to the atmosphere at a disengaged position of said resilient disk;

d. a brake adapter plate rigidly attachable to said brake side of said housing, said coupling member rigidly attachable to said brake adapter plate, said brake adapter plate fixing said coupling member to said housing when said modular unit is utilized as a brake;

e. means for changing the fluid pressure in said vacuum chamber to cause said resilient disk to flex resulting in engagement of said resilient disk with said annular friction ring to couple said shaft with said coupling member;

f. a pressure plate connecting said resilient disk to said sleeve member; and g. a plurality of thin disc shaped shims disposed between said sleeve member and said resilient disk, said plurality of shims defining a gap between said annular friction ring and said resilient disk, wherein said plurality of shims are individually removable to maintain said gap within a preferred range as said annular friction ring wears down.

8. An intermittent motion device for acting with rotational movement of a shaft having a housing with a clutch side and a brake side and a shaft passing through said housing and a pair of modular units rigidly coupled to said shaft on each of said clutch and brake sides, each said modular unit comprising:

a. a sleeve member rigidly coupled to said shaft;

b. a resilient disk capable of elastically deflecting under a force created by fluid pressure, said resilient disk rigidly attached to said sleeve member;

c. a coupling member rotationally attached to said sleeve member, said coupling member carrying an annular friction ring, said coupling member with annular friction ring being spaced apart from said resilient disk, thereby defining a vacuum chamber open to the atmosphere at a disengaged position of said resilient disk;

d. a brake adapter plate rigidly attachable to said brake side of said housing, said coupling member rigidly attachable to said brake adapter plate, said brake adapter plate fixing said coupling member to said housing when said modular unit is utilized as a brake;

e. means for changing the fluid pressure in said vacuum chamber to cause said resilient disk to flex resulting in engagement of said resilient disk with said annular friction ring to couple said shaft with said coupling member, said means for changing the fluid pressure having at least one actuator assembly associated with said vacuum chamber;

at least one vacuum blocking disc associated with said at least one actuator assembly, said vacuum blocking disc sized and positioned to one of permit and prevent fluid at atmospheric pressure from flowing into said vacuum chamber, said vacuum blocking disc formed of a magnetic material;

at least one electromagnet associated with said at least one vacuum blocking disc; and at least one switch associated with said at least one electromagnet, said at least one switch activating said at least one electromagnet at one point in time to attract said at least one vacuum blocking disc to change the fluid pressure; and wherein said at least one switch is a high-speed microprocessor controlled switch and said microprocessor activates said at least one electromagnet at a second point in time with an opposite polarity for a certain duration to repel said at least one blocking disc.

9. The device of claim 8 wherein said at least one electromagnet is at least two electromagnets and said microprocessor delays activating at least one other of said at least two electromagnets at said second point in time for said certain duration, and wherein said resilient disk of each of said pair of modular units is disengaged contemporaneously to avoid overlap.

10. The device of claim 9 wherein said microprocessor activates said at least one electromagnet at said first point in time with a first threshold power level, and wherein said microprocessor detects when said at least one vacuum blocking disc comes in contact with said at least one electromagnet and reduces said first threshold power level to a second threshold power level when said contact is detected.

11. The device of claim 10 wherein said first threshold power level is 100 percent and said second threshold power level is 50 percent.

12. The device of claim 11 wherein said microprocessor utilizes current controlled pulse width modulation.

13. The device of claim 12 wherein said microprocessor is programmed to learn the characteristics of said electromagnets and automatically tune itself to suit at least one of vacuum and pneumatic clutches.

14. The intermittent motion device of claim 8 wherein said certain duration of reverse polarity is 0.002 seconds.

15. An intermittent motion device for acting with rotational movement of a shaft having a housing with a clutch side and a brake side and a shaft passing through the housing:

a. a pair of modular units carried by and mounted at spaced apart locations on said shaft on opposite sides of said housing;

b. each of said pair of modular units having a sleeve member, a resilient disk, and a coupling member, said sleeve member rigidly coupled to said shaft, said resilient disk capable of elastically deflecting under a force created by fluid pressure, said resilient disk rigidly attached to said sleeve member, said coupling member rotationally attached to said sleeve member, said coupling member carrying an annular friction ring;

c. a vacuum chamber between said coupling member carrying an annular friction ring and said resilient disk, said vacuum chamber defined by a space between said coupling disk carrying an annular friction ring and said resilient disk, said vacuum chamber open to the atmosphere at a disengaged position of said resilient disk;

d. a brake adapter plate rigidly attached to said brake side of said housing, a coupling member of one of said pair of modular units rigidly attached to said brake adapter plate, said brake adapter plate fixing said coupling member of one of said pair of modular units to said housing in a brake configuration; and e. means for changing the fluid pressure in said vacuum chamber to cause said resilient disk to flex resulting in engagement of said resilient disk and said annular friction ring, said means having at least one vacuum blocking disc associated with said vacuum chamber, said vacuum blocking disc sized and positioned to one of permit and prevent fluid at atmospheric pressure from flowing into said vacuum chamber, said vacuum blocking disc formed of a magnetic material, said means also having at least one electromagnet associated with each said at least one vacuum blocking disc for one of attracting and repelling said at least one vacuum blocking disc, said means further having at least one switch associated with said at least one electromagnet, said switch activating said at least one electromagnet at a first point in time to attract said at least one vacuum blocking disc and activating said at least one electromagnet at a second point in time with an opposite polarity for a certain duration to repel said at least one vacuum blocking disc.

16. The device of claim 15 further comprising:

e. a pressure plate attaching said resilient disk to said sleeve member; and f. a plurality of thin disc shaped shims disposed between said resilient disk and said sleeve member, said plurality of shims defining a gap between said annular friction ring and said resilient disk, wherein said plurality of shims are individually removable to maintain said gap in a preferred range as said annular friction ring wears down.

17. The device of claim 15 wherein said certain duration of reverse polarity is 0.002 seconds.

18. The device of claim 15 wherein said at least one switch is a high speed switch driven by a microprocessor utilizing current controlled pulse width modulation, said microprocessor programmed to learn the characteristics of said at least one electromagnet and automatically tune itself to suit at least one of vacuum and pneumatic clutches.

19. The device of claim 18 wherein said microprocessor activates said at least one electromagnet at said first point in time with a first threshold power level and reduces said first threshold power level at a second point in time to a second threshold power level.

20. The device of claim 19 wherein said second point in time occurs when said at least one vacuum blocking disc magnetically attaches to said at least one electromagnet, and wherein said first threshold power level is about 100 percent and said second threshold power level is about 50 percent.

21. The device of claim 15 further comprising providing a coast time period wherein said resilient disk and said annular friction ring of each of said pair of modular units is contemporaneously disengaged.

22. The device of claim 21 wherein said coast time period is coincident with and equal to said certain duration of said opposite polarity applied to said at least one electromagnet at said second point in time.

23. The device of claim 15 wherein said at least one vacuum blocking disc is a round disc having four straight edges ground into it to form a square with rounded corners.

24. The device of claim 23 wherein 0.050 inch is ground from said at least one vacuum blocking disc.

25. A modular unit for use with an intermittent motion device having a housing with a brake side, a clutch side, and a rotatable shaft passing through said housing, said modular unit comprising:

a. a sleeve member rigidly coupled to said shaft;

b. a resilient disk capable of elastically deflecting a force created by fluid pressure; said resilient disk rigidly attached to said sleeve member;

c. a coupling member rotationally attached to said sleeve member, said coupling member carrying an annular friction ring, said coupling member with annular friction ring being spaced apart from said resilient disk, thereby defining a vacuum chamber open to the atmosphere at a disengaged portion of said resilient disk;

d. a brake adapter plate rigidly attachable to said brake side of said housing, said coupling member rigidly attachable to said brake adapter plate, said brake adapter plate fixing said coupling ember to said housing when said modular unit is utilized as a brake; and e. means for changing the fluid pressure in said vacuum chamber to cause said resilient disk to flex resulting in engagement of said resilient disk with said annular friction ring to couple said shaft through said coupling member.

26. The modular unit of claim 25 further comprising:

f. a pressure plate connecting said resilient disk to said sleeve member; and g. a plurality of thin disc shaped shims disposed between said sleeve member and said resilient disk, said plurality of shims defining a gap between said annular friction ring and said resilient disk, wherein said plurality of shims are individually removable to maintain said gap within a preferred range as said annular friction ring wears down.

27. A method of operating a fluid operated clutch-brake device having at least one electromagnet for actuating at least one vacuum blocking disc for engaging and disengaging a resilient disc with a coupling member, said method comprising reversing the polarity of said at least one electromagnet for a first certain duration causing said at least one vacuum blocking disc to be repelled to quickly disengage said resilient disc and said coupling member; and wherein said at least one electromagnet is at least two electromagnets and said at least one vacuum blocking disc being at least two vacuum blocking discs, and wherein said method further comprises delaying energization of a second one of said at least two electromagnets for a second certain duration after said reverse polarity is applied to disengage said first resilient disc, whereby actuation of a second one of said at least two vacuum blocking discs is delayed which delays engagement of said second resilient disc and both said first and said second resilient discs are contemporaneously disengaged.

28. The method of claim 27 wherein said second certain duration is about 0.002 second.

29. A method of operating a fluid operated clutch-brake device having at least one electromagnet for actuating at least one vacuum blocking disc for engaging and disengaging a resilient disk with a coupling member, said method comprising:

reversing the polarity of said at least one electromagnet for a first certain duration causing said at least one vacuum blocking disc to be repelled to quickly disengage said resilient disk and said coupling member;

wherein said at least one electromagnet being at least two electromagnets and said at least one vacuum blocking disc being at least two vacuum blocking discs, wherein delaying energization of a second one of said at least two electromagnets for a second certain duration after said first resilient disk disengages, such that actuation of a second one of said at least two vacuum blocking discs is delayed which delays engagement of said second resilient disk and both said first and said second resilient disks are contemporaneously disengaged; and wherein said first certain duration and said second certain duration are contemporaneous.

30. The method of claim 29 wherein said second certain duration is about 0.002 second.

31. A method of operating a fluid operated clutch-brake device having at least one electromagnet for actuating at least one vacuum blocking disc for engaging and disengaging a resilient disk with a coupling member, said method comprising:

reversing the polarity of said at least one electromagnet for a first certain duration causing said at least one vacuum blocking disc to be repelled to quickly disengage said resilient disk and said coupling member;

wherein said at least one electromagnet being at least two electromagnets and said at least one vacuum blocking disc being at least two vacuum blocking discs and further including delaying energization of a second one of said at least two electromagnets for a second certain duration after said first resilient disk disengages, such that actuation of a second one of said at least two vacuum blocking discs is delayed which delays engagement of said second resilient disk and both said first and said second resilient disks are contemporaneously disengaged;

energizing one of said at least two electromagnets at a first threshold power level;

detecting when one of said at least two vacuum blocking discs contacts said one of said at least two electromagnets; and reducing said first threshold power level to a second threshold power level effective to hold said one of said at least two vacuum blocking discs to said one of said at least two electromagnets.

32. The method of claim 31 wherein said first threshold power level is about 100 percent and said second threshold power level is about 50 percent.

* * * * *

UNITED STATES PATENT AND TRADEMARK OFFICE

CERTIFICATE OF CORRECTION

PATENT NO. : 5,971,120

DATED : October 26, 1999

INVENTOR(S) : ROBERT H. BESSEMER, ROBERT J. DAILY, DAVID H. CZARNIK, STEVE LYONS, GLEN A. MORRIS, LARRY E. DISMANG

It is certified that error appears in the above-indentified patent and that said Letters Patent is hereby corrected as shown below:

Column 11, line 14, change "ember" to --member--.

Signed and Sealed this

Second Day of May, 2000

Attest:

Q. TODD DICKINSON

*Attesting Officer*

*Director of Patents and Trademarks*